(12) United States Patent
Kervinen et al.

(10) Patent No.: US 9,058,554 B2
(45) Date of Patent: Jun. 16, 2015

(54) TRANSPONDER WITH TAMPER PROTECTION

(75) Inventors: Kirsi Kervinen, Nokia (FI); Tero Koivisto, Pälkäne (FI); Tuomas Koskelainen, Pirkkala (FI)

(73) Assignee: SMARTRAC IP B.V., Amsterdam (NL)

( * ) Notice: Subject to any disclaimer, the term of this patent is extended or adjusted under 35 U.S.C. 154(b) by 0 days.

(21) Appl. No.: 14/360,238

(22) PCT Filed: Nov. 25, 2011

(86) PCT No.: PCT/FI2011/051039
§ 371 (c)(1),
(2), (4) Date: May 22, 2014

(87) PCT Pub. No.: WO2013/076352
PCT Pub. Date: May 30, 2013

(65) Prior Publication Data
US 2014/0263659 A1 Sep. 18, 2014

(51) Int. Cl.
*G06K 19/00* (2006.01)
*G06K 19/077* (2006.01)
(Continued)

(52) U.S. Cl.
CPC ............ *G06K 19/07798* (2013.01); *D06H 1/04* (2013.01); *G06K 19/07372* (2013.01); *G09F 3/0297* (2013.01); *G09F 2003/0282* (2013.01); *G08B 13/2417* (2013.01); *G08B 13/2431* (2013.01); *G08B 13/2434* (2013.01); *G08B 13/2448* (2013.01); *G06K 19/027* (2013.01); *G06K 19/07381* (2013.01)

(58) Field of Classification Search
None
See application file for complete search history.

(56) References Cited

U.S. PATENT DOCUMENTS

| 5,508,684 A | 4/1996 | Becker |
| 2005/0012616 A1 | 1/2005 | Forster et al. |

(Continued)

FOREIGN PATENT DOCUMENTS

| EP | 0825554 | 2/1998 |
| WO | 2011066358 | 6/2011 |

OTHER PUBLICATIONS

International Search Report (ISA/FI) mailed on Oct. 18, 2012.
(Continued)

*Primary Examiner* — Michael G Lee
*Assistant Examiner* — Tabitha Chedekel
(74) *Attorney, Agent, or Firm* — Ziegler IP Law Group, LLC.

(57) ABSTRACT

The invention relates to sewable tamper detection elements for radio frequency identification devices, and to radio frequency identification devices with such tamper detection elements. The devices can be sewn into a seam of a garment so that the tamper detection element is partially inside the garment, e.g. as part of a care label. This makes removing the device difficult without breaking the tamper detection element, and thereby shoplifting attempts can be more reliably noticed. For this purpose, the tamper detection element is formed so that sewing through it does not break the element. The radio frequency identification device may be formed asymmetric so that the tamper detection element is on a different side from the antenna elements with respect to the chip. In this manner, the disturbance from the tamper detection element to the antenna can be minimized. The tamper detection element may be formed so that it contains a transparent opening on which text can be printed.

20 Claims, 4 Drawing Sheets

(51) Int. Cl.
*D06H 1/04* (2006.01)
*G06K 19/073* (2006.01)
*G09F 3/00* (2006.01)
*G06K 19/02* (2006.01)
*G09F 3/02* (2006.01)
*G08B 13/24* (2006.01)

(56) References Cited

U.S. PATENT DOCUMENTS

2008/0020189 A1 1/2008 Hofmair et al.
2008/0157975 A1 7/2008 White et al.

OTHER PUBLICATIONS

Written Opinion (ISA/FI) mailed on Oct. 18, 2012.

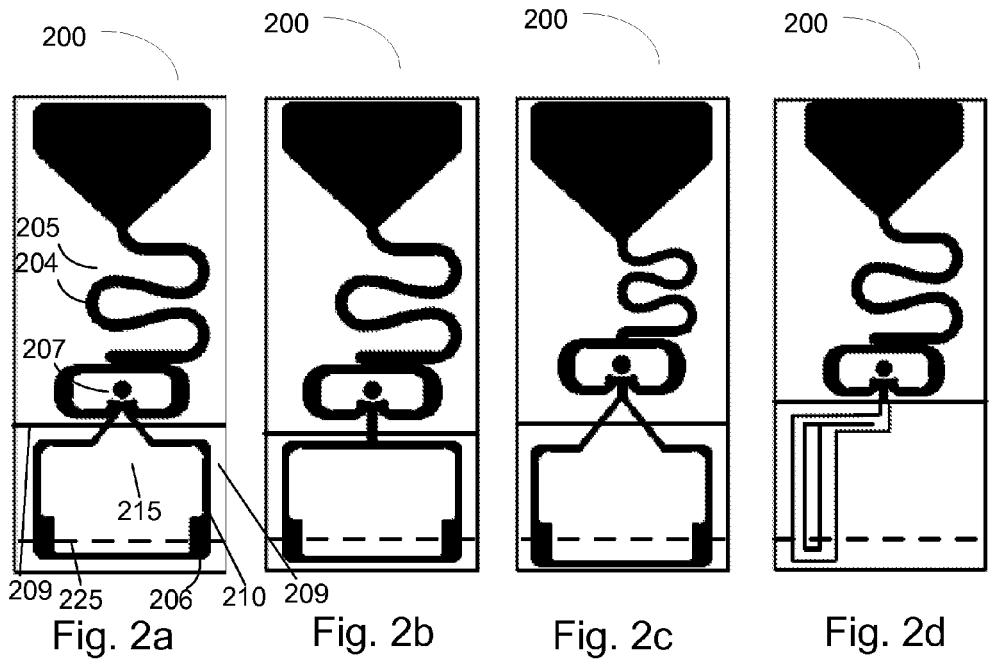
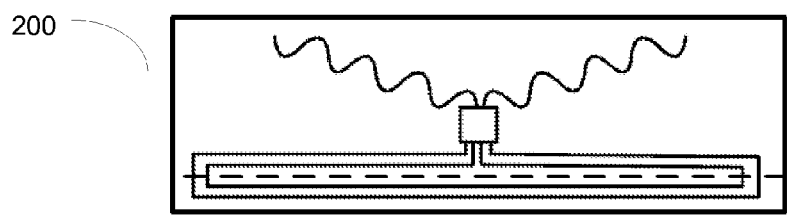
Fig. 2e
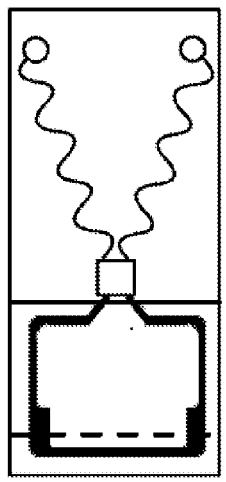
Fig. 2f
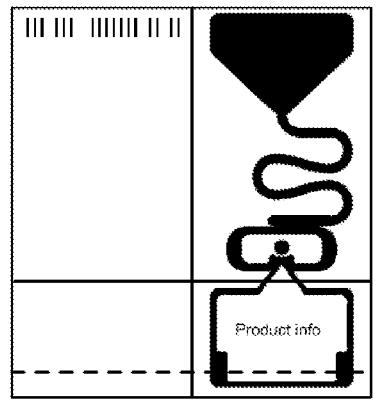
Fig. 2g

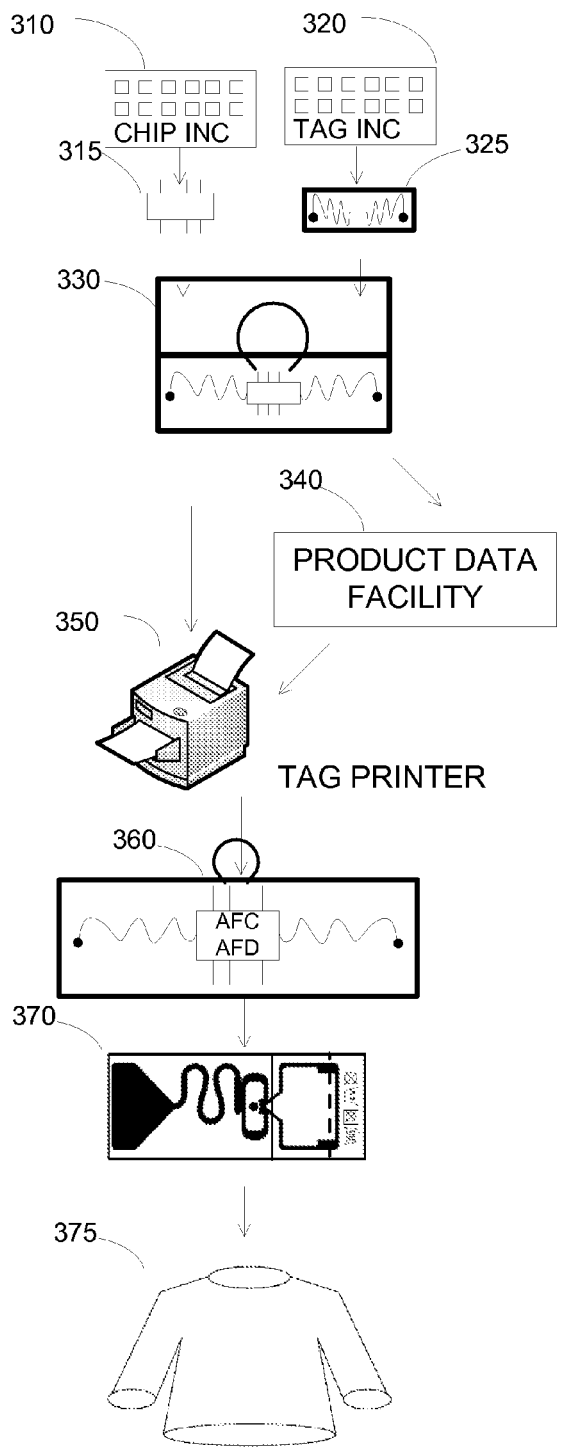
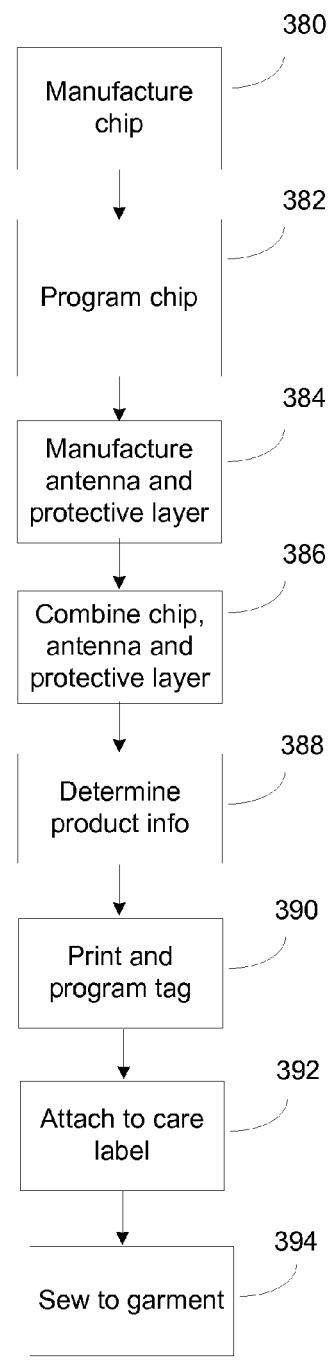
Fig. 3a                    Fig. 3b

TRANSPONDER WITH TAMPER PROTECTION

FIELD OF THE INVENTION

The present invention relates to radio-frequency transponders and elements for such transponders that have a tamper-protection means, as well as to systems and methods for the same.

BACKGROUND OF THE INVENTION

RFID (Radio Frequency Identification) transponders are utilized in consumer products to identify such a product among other products but also to give information on the product. An RFID transponder can be attached to the product, such as a clothing, a book, an electronic device, etc. Traditionally RFID transponders have been attached to the product as adhesive tags or as hang tags and used mostly for logistic purposes. RFID transponders can also be used for preventing shoplifting (to be used in parallel or to replace current electronic article surveillance components). In such applications, the RFID transponder may be hidden into the product or attached to the product in such way that it cannot be removed without breaking the transponder and the product.

When an item having an RFID transponder is legally bought, at the time of payment, the cashier disables the RFID transponder which until that time has been functional. In other words, if an RFID transponder on the item hasn't been disabled at the cashier, such an item can be later detected by a reader when the item is illegally removed from the store, causing an alarm in the case of a shoplifting attempt. However, if the transponder has been removed so that the antenna of the RFID transponder has been broken apart or damaged, the reader cannot any more read or even detect the transponder. This limits the possibilities to use traditional RFID transponder for electronic article surveillance (EAS) purposes.

There is, therefore, a need for a solution that makes the detection of shoplifting and other EAS type applications more reliable.

SUMMARY OF THE INVENTION

Now there has been invented an improved method and technical equipment implementing the method, by which the above problems are alleviated. Various aspects of the invention include methods, devices and apparatuses, and arrangements for the same, which are characterized by what is stated in the independent claims. Various embodiments of the invention are disclosed in the dependent claims.

The invention relates to sewable tamper detection elements (i.e. an element that can be sewn over without breaking the element) for radio frequency identification devices, and to radio frequency identification devices with such tamper detection elements. More generally, the invention also relates to penetratingly attachable tamper detection elements and devices with the same. The devices can be sewn into a seam of a garment so that the tamper detection element is partially inside the garment, e.g. as part of a care label. This makes removing the device difficult without breaking the tamper detection element, and thereby shoplifting attempts can be more reliably noticed. For this purpose, the tamper detection element is formed so that sewing through it does not break the element. The radio frequency identification device may be formed asymmetric so that the tamper detection element is on a different side from the antenna elements with respect to the chip. In this manner, the disturbance from the tamper detection element to the antenna can be minimized. The tamper detection element may be formed so that it contains a transparent opening on which text can be printed or through which the text may be viewed. The invention aims for a tamper detection element, which can be easily and reliably attached to an item, is difficult to remove without becoming indicative of tampering, causes minimal interference to the combined radio frequency identification device, and is compatible with the preferred spatial geometry of the radio frequency identification device.

According to a first aspect of the invention, there is provided a tamper-protection loop element for use in a tamper-protection loop of a radio-frequency transponder, the loop element being electrically conducting and arranged to be penetratingly attachable to an object such that a seam is formed in the attaching and said element arranged such that said penetrating maintains electrical conductivity of the element for indicating intactness of the tamper-protection loop.

According to an embodiment, said loop element comprises a sewable part, said sewable part being electrically conducting for passing electric current through the tamper-protection element such that intactness of the tamper-protection element can be detected, said sewable part having a shortest width, said shortest width being larger than the thickness of a sewing needle such that said sewable part can be sewn through with said sewing needle without breaking the electrical conductivity of the sewable part. According to an embodiment, said loop element comprises a conductor layer, a conductor grid or a plurality of conductors having in total a shortest width sufficient for sustaining needle punctures and maintaining electrical conductivity of the element for indicating intactness of the tamper-protection loop. According to an embodiment, the tamper-protection loop According to a second aspect, there is provided a tamper-protection loop for a radio-frequency transponder, comprising the loop element as above, said tamper-protection loop being electrically conducting for passing electric current through the tamper-protection loop such that intactness of the tamper-protection loop can be detected.

According to an embodiment the tamper-protection loop comprises flexible soft material suitable for wearing.

According to a third aspect, there is provided a conductor arrangement for a radio-frequency transponder, said arrangement comprising the tamper-protection loop as above for a radio-frequency transponder, and an antenna for said radio-frequency transponder.

According to an embodiment, the conductor arrangement comprises a chip position for a radio-frequency identification chip, said antenna being placed essentially asymmetrically with respect to said chip position, said tamper-protection loop placed on an opposite side of the antenna with respect to said chip position.

According to a fourth aspect there is provided a conductor arrangement for a radio-frequency transponder, said arrangement comprising a pad area for attaching a radio-frequency identification chip, said antenna being placed essentially asymmetrically with respect to said pad area, said tamper-protection loop placed on an opposite side of the antenna with respect to said pad area.

According to a fifth aspect there is provided a conductor arrangement for a radio-frequency transponder, said arrangement comprising a tamper-protection loop for said radio-frequency transponder, and an antenna for said radio-frequency transponder, said arrangement comprising a chip position for a radio-frequency identification chip, said antenna being placed essentially asymmetrically with respect to said position, said loop placed on an opposite side of the antenna with respect to said chip position.

According to an embodiment of any conductor arrangement, said loop is arranged to be closed by an attachable conducting segment such as conducting sewing thread, glue or an attachable conductor element.

According to a sixth aspect, there is provided a radio-frequency transponder comprising on at least one substrate a conductor arrangement as above and a radio-frequency transponder chip electrically coupled to said conductor arrangement.

According to an embodiment, said antenna is a monopole antenna.

According to a seventh aspect there is provided a radio-frequency transponder comprising a chip, a tamper-detection element and a monopole antenna.

According to an eighth aspect there is provided a radio-frequency transponder comprising a chip, a tamper-detection element and an asymmetric dipole antenna.

According to an embodiment of any transponder, said loop is placed on an opposite side of the antenna with respect to said chip.

According to a ninth aspect there is provided a product label for a product comprising a radio-frequency transponder, a tamper-protection loop with a penetratingly attachable tamper-protection loop element as above, said tamper-protection loop element being located on the product label at a place where said product label can be penetratingly attached to said product such that product information on the product label is left visible.

According to an embodiment, the product label is a care label for a garment, and a tamper-protection loop element with a sewable part as above, said sewable part being located on the care label at a place where said care label can be sewn to a garment such that care indicators on the care label are left visible. According to an embodiment, the tamper-protection element is placed essentially along at least one edge of said product label. According to an embodiment, the tamper-protection element having an opening in the middle.

According to a tenth aspect there is provided a care label for a garment, said care label comprising a radio-frequency identification transponder, said transponder comprising a tamper-detection element, said tamper-protection element having an opening in the middle such that text can be visibly printed inside said opening on the care label.

According to an embodiment, the care label comprises an indication for cutting away said transponder, said indication positioned so that when said care label is cut along said indication, said tamper-protection loop is cut and the electrical conductivity of said tamper-protection loop is broken. According to an embodiment, the care comprises a perforation such that said care label can be torn along said indication, breaking the tamper-protection element. According to an embodiment, wherein said tamper-protection element is mounted on the care label in a removable manner so that said tamper-protection element can be removed by hand. According to an embodiment, the care label comprises a hard substrate or protective layer in the area of said antenna and said chip such that said hard substrate or protective layer is arranged to prevent breaking said antenna or said chip by cutting or tearing.

According to an eleventh aspect there is provided a care label for a garment, said care label comprising a radio-frequency identification transponder, said transponder comprising a chip, an antenna, and a tamper-detection element, said care label comprising a hard substrate or protective layer in the area of said antenna and said chip such that said hard substrate or protective layer is arranged to prevent breaking said antenna or said chip by cutting or tearing.

According to a twelfth aspect there is provided a garment comprising a care label as above.

According to an embodiment, the garment comprises a care label sewn into a seam of the garment so that a part of tamper loop extends into the seam, and the seam has been sewn into said tamper loop such that removing said care label from the garment without breaking the tamper loop is difficult.

According to a thirteenth aspect there is provided a method of manufacturing a care label for a garment, comprising dividing said care label to a first part to be left in said garment and a second part to be removed, printing product information such as instructions for care on said first part of said care label, placing a radio-frequency transponder on said care label, said transponder comprising a chip, an antenna and a tamper-protection element, wherein said tamper-protection element is placed on said first part of said care label and said chip and said antenna are placed on said second part of said care label, and attaching the radio-frequency transponder to said care label.

According to an embodiment, the method comprises attaching conducting material between a first part of said tamper-protection loop and a second part of said tamper-protection loop to form a closed, electrically conducting tamper-protection loop, for example by sewing with an electrically conducting thread or by using an electrically conducting glue or paste. According to an embodiment, said dividing comprises printing a cutting indicator on said care label.

According to a fourteenth aspect there is provided a method of manufacturing a garment, comprising placing a care label as above at least partially on a layer of fabric, said care label comprising a radio-frequency transponder with a tamper-protection loop having a penetratingly attachable element, and attaching said care label to said garment by sewing, gluing or stapling said layers of fabric and said care label together to form a seam, said seam being located at least partially across said penetratingly attachable element of said tamper-protection loop such that removing said care label from the garment without breaking the tamper-protection loop is difficult.

According to an embodiment, the method comprises attaching said care label to said garment such that care indicators on the care label are left visible.

According to a fifteenth aspect there is provided a method of re-using a tamper-protected care label, said care label comprising a radio-frequency transponder with a tamper-protection loop having a penetratingly attachable element, said method comprising removing said tamper-protected care label from a garment by cutting sewing threads of a seam where the care label has been sewn into along said penetratingly attachable part, placing said care label at least partially on a layer of fabric, and attaching said care label to said garment by sewing, gluing or stapling said layers of fabric and said care label together to form a seam, said seam being located at least partially across said penetratingly attachable part of said tamper-protection element such that removing said care label from the garment without breaking the tamper-protection element is difficult.

According to a sixteenth aspect there is provided a method of manufacturing a garment comprising placing a care label through a hole in said garment, said care label comprising a radio-frequency transponder with a tamper-protection loop having a penetratingly attachable element, forming a closed loop of said care label such that part of said garment is left inside said care label loop, and attaching said care label to said garment by sewing, gluing or stapling said care label loop into a closed loop to form a seam, said seam being located at least partially across said penetratingly attachable element of said tamper-protection loop such that removing said care label from the garment without breaking the tamper-protection loop is difficult.

DESCRIPTION OF THE DRAWINGS

In the following, various embodiments of the invention will be described in more detail with reference to the appended drawings, in which

FIGS. 2a, 2b, 2c, 2d, 2e and 2f show a tamper protection for tags, tags and labels with such tags according to the invention;

FIG. 2g shows a label for the tags according to the invention;

FIGS. 3a and 3b show a system and a method for manufacturing tags and products having tamper-protection functionality according to the invention.

DETAILED DESCRIPTION OF EXAMPLE EMBODIMENTS

Figure 1A:
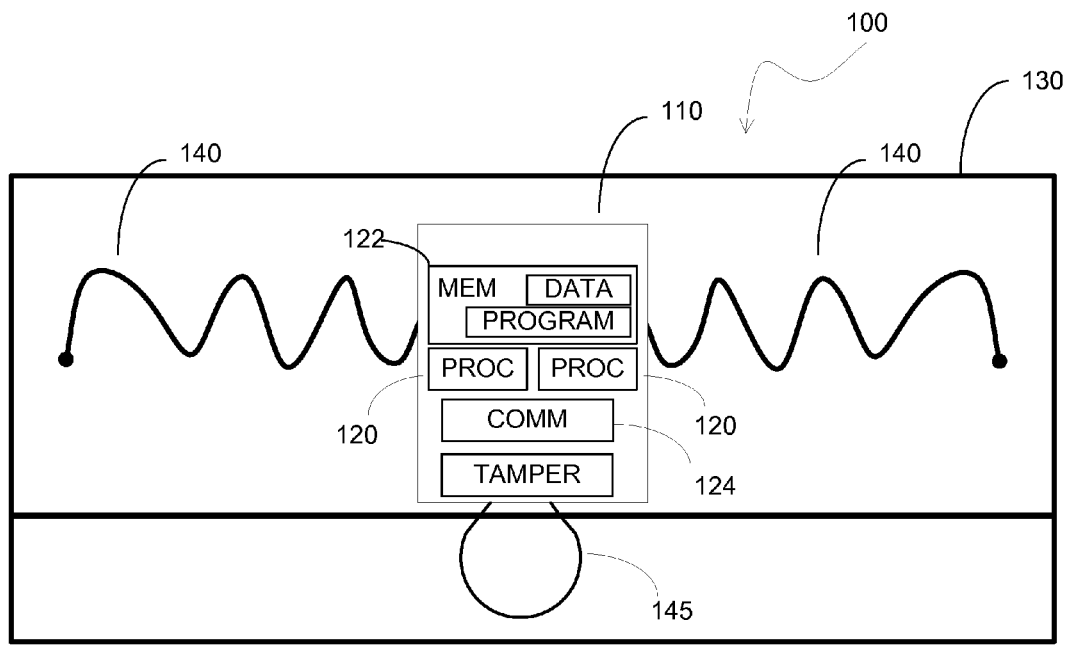
FIGS. 1a and 1b show block diagrams of an RFID tag and a reader device according to the invention.

In the following, several embodiments of the invention will be described in the context of radio frequency identification (RFID) tags. It is to be noted, however, that the invention is not limited to RFID tags and systems only. Some examples are directed towards theft protection of garments, and the invention is not to be understood to be limited to such purposes. In fact, the different embodiments have applications widely in any environment where improved theft protection capabilities are needed.

Over time, the needs of having various kinds of information available on a product outgrew the capabilities of a simple bar code. To this end, new technologies were developed, such as two-dimensional bar codes. Of such technologies, radio frequency identification (RFID) has rather quickly become the technology of choice for identifying and tracking items. RFID technology has a vast number of applications making use of the ability to read an RFID tag from a distance even without a line-of-sight connection between the reader and the tag. RFID is quickly replacing or at least augmenting the bar code technology in many places.

The basic information that an RFID tag carried has traditionally been electronic product code (EPC) information and/or tag identification information (tag ID). RFID tags with more capabilities may have the ability to store more information in the tag memory, and even carry out some processing of data.

A radio frequency identification tag (RFID tag) typically comprises a chip and an antenna connected to the chip, attached to or protected inside a plastic layer. The RFID chip contains analog and/or digital processing circuitry, e.g. a state machine and/or a processor and memory for storing information, as well as circuitry for receiving radio frequency (RF) energy and modulating the RF wave. The chip is connected to the antenna, whose shape and size depend on the frequency at which the tag operates and the application for which the tag is used. The chip and the antenna are often laid inside a thin plastic laminate or container for protection. The tag as a whole is typically flexible to a certain degree, especially the passive tags that do not contain a power supply.

Passive tags use the energy from the radio-frequency electromagnetic field of the read-out signal to power the operations that the tag carries out. Passive tags operate essentially while they are in the reader field, and are essentially inactive at other times. As described above, the tag causes a response to the reader signal to be available in the electromagnetic field, and thus acts as a transponder. In other words, a device where there is an antenna connected to a chip so that it can respond to a read-out signal may be understood to be a transponder. A tag comprising these elements may also be understood to be a transponder. The farther the reader device and the weaker the read-out signal, the less energy is available for the tag to use. This in turn means that the tag may not be able to perform very complex operations that would require a lot of power, since such tags could only be read from a short distance away. In other words, the read-out distance of a tag is to a large extent determined by the power consumption requirements of the tag. Naturally, the attenuation and power distribution of the electromagnetic signal emitted by the tag is another concern. To tackle this issue, some passive tags have a battery that may be used to power the processing circuitry and thereby allow longer operating range for the tag. Such tags that use an internal power source to energize the response signal may be called semi-passive tags. The design of the antenna of the tag plays an important role in ensuring good performance of the tag. Further, in some applications battery operated active tags are used. These type of tags may actively RF transmit using battery energy even without the presence of a reader field.

A transponder may be understood to be any remotely accessible identification device that responds to an identification query by sending back an identification signal e.g. by means of back-scattering. For example, smart tags operating over radiofrequency connection such as a RFID tag, NFC tag or RF-EAS tag (radiofrequency electronic article surveillance), e.g. operating in the HF and/or UHF frequency ranges, and other tags for theft protection may be transponders in the context of the present invention.

Figure 1B:
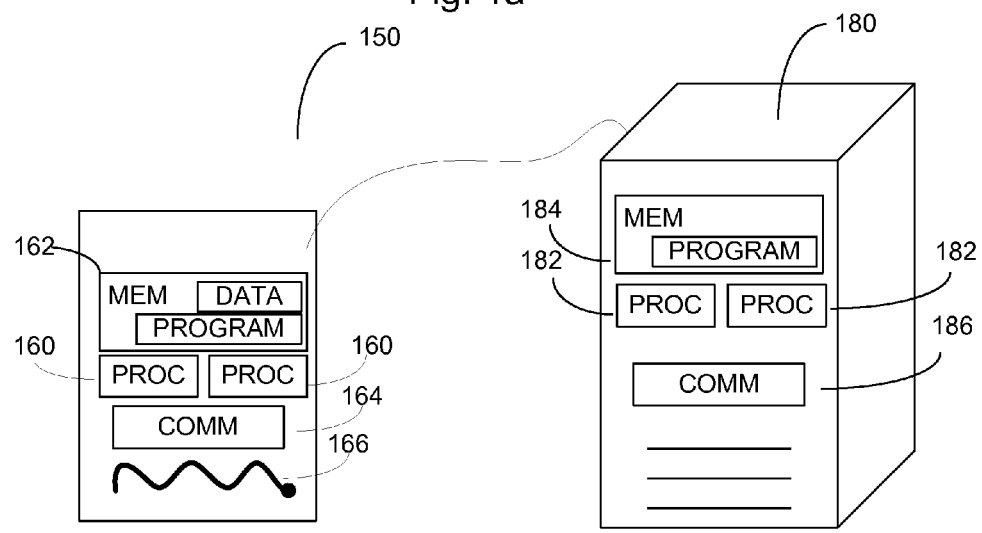

FIGS. 1a and 1b show block diagrams of an RFID and a reader device according to the invention.

In FIG. 1a, a passive tag 100 such as an RFID according to an embodiment is shown. The tag may comprise a chip 110, a substrate such as protective surface 130 and an antenna 140. In practical settings, the tag may be formed on a substrate 130, but as an example, a tag may also be formed without a substrate. The antenna 140 is electrically coupled to the chip 110, and the chip and the antenna are formed inside the protective surface 130. The tag also comprises a tamper-protection arrangement, typically consisting of an electrically conducting tamper loop 145, also electrically coupled to the chip 110. The chip may comprise analog and digital (logic) circuitry to perform its operations, and/or it may comprise one, two or more processors 120, memory 122 as one, two or more memory sections, one or more communication modules (e.g. both HF and UHF modules) 124 such as a radio frequency modulation circuit coupled to the antenna 140, and a tamper detection module or circuit electrically coupled to the tamper loop. The tamper detection module may operate so that it determines e.g. by measuring resistance of the tamper loop to determine whether the loop has been broken, and sets a flag in a memory to indicate the status of the tamper loop. The status of the tamper loop can be queried from the tag, and the tag can send the status to a reader device. The program and/or logic may be in the form of microcode for a processor, a gate arrangement and/or programmable logic.

In other words, a tag may be formed e.g. so that a conductor arrangement (e.g. pattern made of aluminum layer) is formed on top of a substrate, e.g. by etching. The formed antenna/conductor pattern is then joined electrically with a chip, and thus a transponder is formed. Such a transponder in a basic arrangement may e.g. be called an RFID inlay. Additional layers of glue, paper, fabric, plastic or other materials may be added to form a laminate, that is, the tag in its final form to be used in an end product.

The memory 122 may comprise executable instructions for the processor, data and information related to the operation of the tag such as en electronic product code, tag identification, check sum, passwords like an access password for accessing the tag, and user data. For example, the memory may contain an identification identifying the tag or product to which the tag is attached. Some of the memory may be read-only memory, and some of the memory may be writable. The memory may be write-once memory, whereby it is programmed in an early phase in the life span of a tag, or it may be write-protected by an access password. The memory may contain an access password for verifying access rights to some functionality or to a memory area. For example, an access password may be residing in the memory, and by sending the access password to the device, access is granted to a memory area. The memory area may then contain a kill password, and sending the kill password as a parameter or argument in a "kill" command or a "destroy" command makes the tag turn inactive, i.e. kills the tag.

It has here been noticed that in addition to regular memory areas, application data such as the first and second identification may be, surprisingly, stored into the kill password area, since reading the kill password area may not kill the tag.

The protective surface 130 may be made of plastic, paper or any other suitable material, preferably material that is flexible. There may be the same protective surface in the area of the tamper loop 145, or the protective surface may be thinner or missing, or made of a different material such as a highly flexible material. A different protective material in the area of the tamper loop may make it feasible to leave that part into a wearable garment so that the material is not too harsh or sharp for the skin. The protective material may be electrically and magnetically non-conducting in order not to obstruct the operation of the antenna 140, or the material may be weakly conducting or conducting. The tag may contain no battery for powering the processor. The basic operation of the tag is to extract energy from a reader signal, and to respond to the reader signal. This responding may happen by employing back-scatter modulation of the radio frequency field (e.g. for UHF tags), or by varying the load imposed by the tag on the magnetic field (e.g. for HF tags). Typically, the tag may send an electronic product code (EPC) and/or a tag identifier (TID), or an universal identifier (UID) code, EAN code, or any serial number as a response.

An RFID tag or a device may operate according to a standard. For example, the air interface may be standardized to enable interoperability of tags and reader devices. The air interface may operate according to an UHF standard wherein the tag utilizes back-scattering modulation in communication. The air interface may operate according to an HF standard wherein the tag utilizes load variation in the magnetic field. The various pieces of information stored in the tag and sent by the tag such as the EPC code may be standardized e.g. according to a Gen2 standard. The tag and/or a reader device may be standardized as a whole. The access password and/or the kill password may be determined by an EPC Gen2 standard, or they may be determined by another standard, or they may be non-standard or customized password fields.

The remote-access device, transponder or a tag may have various forms. For example, the tag may comprise an inlay placed inside plastic protective layers, or inside paper or cardboard. The remote-access device may also be a tag embedded in an object, e.g. a tag inside a food package. The remote-access device may also be any object capable of operating according to the various embodiments and being otherwise energetically essentially passive. For example, the remote-access device may be a food package, container, box, barrel, pallet, vehicle or a piece of furniture like a shelf. It also needs to be understood that a remote-access device can be without definite form or it may not be an end-product. For example, a chip for an RFID device, or the combination of a chip and an antenna may form a remote-access device in an embodiment of this invention.

In a particular embodiment of this invention, the transponder may be formed into a care label for a wearable garment such as a jacket, shirt, skirt or trousers. The care label may have an RFID inlay on one surface, e.g. on the inside surface of a foldable care label. The care label may be attached to a garment e.g. by sewing. The part of the care label that contains the RFID chip and the antenna (and possibly a thicker protective layer) may be intended to be removed before wearing.

FIG. 1b shows a reader device 150 according to an embodiment for reading information from tags. The reader device 150 comprises digital and analog circuitry for communicating with tags e.g. RFID tags. The reader device may comprise one, two or more processors 160, memory 162 as one, two or more memory sections and a communication module 164 such as a radio frequency modulation circuit coupled to an antenna 166. The memory 162 may comprise executable program code for the processor 160, and some of the program code and other means may be for accessing a service based on a first identification and a second identification as explained earlier. The memory 162 may also comprise program code for any application, and program code for reading/writing application data or the identifications from/to the tag. The reader device 150 may be operatively connected (e.g. by means of a computer network, a fixed data connection or a wireless connection) to a computer or server 180. The computer or server 180 may comprise one or more processors 182, memory 184 and communication means 186 for communicating with computers and reader devices. The server 180 may comprise database functionality for providing a service based on information received from a tag through a reader device. The server 180 may be networked with other servers, and the server 180 may alone or together with other servers provide a network service for utilizing the information and identifiers on RFID.

It needs to be understood that the reader device may be a dedicated reader device like a hand-held reader or a reader integrated into another apparatus such as a vehicle or a building. It also needs to be understood that the reader device may have capability to write data into the tags, too. The reader device may also be a multipurpose device such as a personal computer, another personal electronic device such as a wrist watch or a smart phone with an RFID application and means for communicating with tags.

The reader device may comprise several antennas, and/or reader devices may form a reader system with which the location of a transponder can be determined for example by using power information or time of flight information from the transponder to the different antennas. In this manner, products such as garments can be located inside the store, and theft protection can be arranged.

The tag may contain data in the memory for sending to the reader device. The data may be in a protected form in either the tag memory, in the reader memory or in an external database. The protection may have been carried out so that the data resides in a memory area protected with an access key, or so that the data has been encrypted or scrambled using an algorithm dependent on an access key. This may be advantageous e.g. to protect the user identity if such has been stored on the tag as the second identifier identifying the user. The data may be wholly or partly stored in a password field of the tag, and the rest of the data may reside in normal memory on the tag, or in the reader, or in an external database. The memory may contain an address or a pointer to application data, e.g. data for obtaining access to a service or the service address directly.

The access key may be stored on the tag memory or a seed for generating the access key may be stored on the tag memory. An algorithm may be used to generate the access key from the access key seed, wherein the algorithm is such that it is unlikely that two different algorithms would produce the same exact access key. Moreover, it may be desirable that the algorithm is such that two different seeds are unlikely to produce the same access key.

FIGS. 2a, 2b, 2c, 2d, 2e and 2f show a tamper protection for tags 200, tags 200, and labels (FIG. 2g) with such tags 200 according to the invention. The different tags and labels can be understood to be RFID transponders comprising a chip 207 and an antenna 204, and in the different embodiments of the invention, a tamper-protection element 210. There may be a substrate 205 supporting the parts. The transponders can e.g. be UHF monopole antenna transponders (FIGS. 2a, 2b, 2c and 2d). The chip of the transponder may be fitted to the antenna with a coupling loop (shown as a loop around the chip) for matching the chip 207 and antenna 204 impedances to each other for efficient operation. The chip has connections for electrically coupling a tamper-protection element (tamper loop) thereto. The chip can detect the intactness of the tamper loop.

In other words, the tamper loop 210 is a galvanic loop separate from the antenna. There exist chips (e.g. NXP G2iL$_+$) that are adapted to accommodate a tamper loop connection for tamper-protection functionality. If the tag (the transponder) is tampered and the tamper loop is broken, a flag in the memory or in the circuits of the chip is reversed to indicate the transponder has been tampered. The status of the transponder can be queried over the air by issuing an appropriate query command. The arrangement of a separate tamper loop is advantageous, because the tamper loop can be broken without having an effect on the functioning of the transponder (i.e. without e.g. breaking the antenna). Therefore, the transponder can still respond and indicate the tampering. This makes such tags suitable for detection of shoplifting.

Particularly for the protection of garments from shoplifting, it is beneficial to attach the transponder tag firmly to the garment to prevent removal of the tag. For example, a transponder can be locked to the garment with a magnetic lock arrangement known to the skilled person. However, such devices are clumsy and difficult to operate, and they do not provide the benefit of allowing follow-up during the logistic chain before the store. On the other hand, traditional hangtags carrying a simple transponder are unreliable since they can be quite easily removed.

It has been noticed in the invention that the transponders can be attached to garments with a special arrangement allowing more reliable detection of shoplifting. The features and elements of the different embodiments of the invention will be explained next.

FIG. 2a shows a transponder 200 with a tamper-protection element 210, and special parts 206 of the tamper protection element. The special parts 206 are arranged to the section of the tamper-protection element (tamper loop) that is intended to be sewn into a seam 225 of a garment to make it difficult to remove the transponder without breaking the tamper protection element. The special parts 206 are arranged to be sewable, that is, arranged to be durable so that they can be sewn through without being broken (along the dashed sew line 225 in FIG. 2a). The special parts, sections or elements 206 have such dimensions and/or structure that when a sewing needle punctures the part or element or chips off material, there is material left in the element so that electric current can still flow through, that is, electric conductivity is retained. Geometrically the special parts 206 have a width that is at its minimum still sufficient for retaining conductivity when a needle punctures the special part. In other words, the minimum width of the special parts is sufficiently greater than the thickness of the needle so that the needle does not break the special part when the part is sewn through.

Alternatively or in addition, the special part may be arranged to have a structure such that it can bend away when the needle presses on the special part. For example, the special part may be a hard, round piece of wire movably attached to the rest of the loop.

Alternatively or in addition, the special part may be arranged so that it comprises a conductor layer, a conductor grid or a plurality of conductors having in total a shortest width sufficient for sustaining needle punctures and maintaining electrical conductivity of the element for indicating intactness of the tamper-protection loop. That is, the special part (tamper-protection loop element) is formed to be physically large enough to be durable when it is sewn so that its electrical conductivity is maintained and the tamper state of the tag is not erroneously changed.

In addition, the special parts may be such in dimension that they endure sewing through approximately once, but not more often. This has the advantage that even if the transponder is carefully removed from a garment by cutting the sewing thread, a second sewing will very probably break the special part and thereby the loop, too. This indicates that the transponder has been tampered by losing the electrical conductivity for passing electric current through the tamper-protection loop, and the loss of intactness of the tamper-protection loop can be detected. In addition, there may be a way provided to re-connect a broken tamper loop back to intact state e.g. by adding a tamper loop patch segment and electrically connecting it to the broken tamper loop to re-connect the loop.

In a more general setting, a tamper-protection loop element for a tamper-protection loop of a radio-frequency transponder may have a property that it is penetratingly attachable to a product. The loop element is electrically conducting and is arranged to be penetratingly attachable to an object such that a seam is formed in the attaching. The element is arranged such that said penetrating maintains electrical conductivity of the element for indicating intactness of the tamper-protection loop. For example, stapling, hot gluing, a kind of puncturing or other penetration to the tamper-protection loop will be sustained by the loop so that electrical conductivity for detection of tampering is maintained.

In other words, a tamper-protection loop element can be penetratingly attached to a product so that when the attachment is made, forming a seam, the element can be comprised in the seam and be difficult to remove without breaking, yet having sustained the penetrating attachment. The seam can be understood to be any kind of flexible or rigid seam or another kind of joining part between the tag and the product.

The tamper-protection loop and/or the special parts may be made of metal (metals conduct electricity) such as aluminum, silver, gold or copper. Alternatively or in addition, they may comprise or be made of another conducting material such as graphite, electrically conducting plastic, rubber, gel, glue or such. The material may be soft such that when it is left on a garment it does not irritate or scratch the skin, i.e. the material is suitable for wearing. It should be noted that the material of the tamper-loop and the material of the other antenna parts of the RFID transponder may be the same or they may be different.

It needs to be appreciated that the special parts described above may be used as a part of a tamper protection loop to form a transponder with a tamper-protection that can be sewn to a garment so that the tamper protection does not break in the attachment. Alternatively, stapling or other kind of attaching is possible where the tag and/or the tamper loop is attached to the product so that the tamper-protection element is penetrated and thereby attached to the product so that the tag (transponder) cannot be easily removed without breaking the tamper loop, but anyhow so that in the penetrating attaching the tamper loop stays operational i.e. does not break. In other words, the tag or transponder may be penetratingly attached to the product. The penetration may be complete or partial, nevertheless preferably such that the material structure of the tag or the tamper loop is joined with the product in such a manner that the structure will break if the tag is removed by force.

It has been noticed in the invention that it may be beneficial to arrange the transponder conductor arrangement to be such that the tamper loop is placed away from the antenna. This may have an advantage that the transponder may be attached to a product such as a garment in a penetrating manner, and when the penetration is carried out, the antenna part may not be effected (not penetrated). Also, it may be beneficial to arrange the tamper loop so that it is thin and small in order to have little electromagnetic coupling to the antenna. Placing the tamper loop away from the antenna may provide an advantage of reducing this electromagnetic coupling to the antenna.

In FIG. 2a, the tamper loop is electrically coupled or connected to the chip that has the tamper-protection functionality. The chip is also connected to the antenna of the transponder. In other words, the tamper loop and the antenna make up a conductor arrangement that can be used to manufacture the transponder by connecting a chip to the conductor arrangement. Such conductor arrangement may be formed e.g. by etching an aluminum pattern on top of a PET plastic substrate.

In other words, a tag such as an RFID UHF tag may comprise a chip, a pad area for attaching the chip to the tag, a coupling loop to electrically fit the chip to the radiator/antenna (e.g. impedance matching), a radiator/antenna part, e.g. a monopole or a dipole antenna, and a tamper loop electrically coupled to the chip so that breaking of the tamper loop may be detected by the chip.

In addition to the special part(s) of the tamper loop, the geometry of the transponder has other advantageous features. These will be explained next.

It has been noticed in the invention that the presence of the electrically conducting tamper loop may with its impedance and/or resonance disturb the operation of the antenna. Typically, a skilled person would arrange the radiating part of the antenna of a transponder to be essentially symmetric with respect to the chip e.g. in order to keep the design simple and to avoid long lead wires to the antenna. In the invention, it has been noticed that an asymmetric antenna design with respect to the chip may provide an electrically more optimal design when the tamper loop is present. In other words, the tamper loop may be put essentially on the opposite side of the chip than the antenna. This may provide several advantages. When the antenna is asymmetric, the geometry provides room for arranging the tamper loop close to the chip and avoid the use of long wires to the tamper loop from the chip. Also, the antenna can be arranged in a different space than the tamper loop, and brought away from the intended cut line for cutting off the transponder after the garment has been legally bought. As in FIGS. 2a-2d, a monopole antenna 204 has been chosen as a companion for the tamper loop, e.g. a UHF monopole antenna. In other words, a radio-frequency transponder 200 comprising a chip 207, a tamper-detection element 210 and a monopole antenna 204 is shown in FIGS. 2a, 2b, 2c and 2d. In these radio-frequency transponders, the tamper loop is placed on an essentially opposite side of the antenna with respect to the chip. The use of a monopole antenna has been noticed to work well in the design, because a monopole antenna has an inherently asymmetric geometry. Also, a dipole antenna with asymmetry may be used.

It needs to be appreciated that a transponder such as an UHF RFID transponder often has an antenna part comprising the actual radiator part (monopole, dipole or a combination) of the antenna and a coupling loop part with which the antenna is matched to the chip. The radiator and the coupling loop are connected through one or more coupling points. Therefore, the description of asymmetry above is to be understood as a whole so that the electromagnetic coupling of the antenna and the tamper loop may reduced by placing them on different sides of the transponder and geometrically this may often mean that the tamper loop and the antenna are on essentially opposite sides with respect to the chip.

In other words, a conductor arrangement for a radio-frequency transponder may comprise a pad area for attaching a radio-frequency identification chip, where the antenna is placed essentially asymmetrically with respect to the pad area and the tamper-protection loop is placed on an opposite side of the antenna with respect to the pad area. The conductor arrangement for a radio-frequency transponder may comprise a tamper-protection loop for the radio-frequency transponder, and an antenna for the radio-frequency transponder, and the arrangement may comprise a chip position for a radio-frequency identification chip, where the antenna is placed essentially asymmetrically with respect to the chip position, and the loop is placed on an opposite side of the antenna with respect to the chip position.

It also needs to be appreciated that the tamper loop has been shown in the figures as a closed loop in a fully operational state, but a tamper loop of a transponder may also be a partial loop, whereby the loop is closed in manufacturing e.g. by conductive sewing thread, glue, paste or with an attachable piece of conductor.

In FIG. 2a, a tamper loop geometry with loop wires spreading out from the chip is shown. This design may be advantageous in terms of small interference with the antenna operation. Another design of the tamper loop is shown in FIG. 2b. In this design, the loop wires exit the chip in parallel, turning to the edge in approximately 90 degrees, thereby allowing the area inside the loop to be rectangular and large. A combination of FIGS. 2a and 2b is possible, too, as in FIG. 2c. In FIG. 2d, the tamper loop has been drawn to the side, allowing a large area next to the loop to be available.

Other antenna designs can be used, as well. For example, FIGS. 2e and 2f show an asymmetric dipole antenna, where the antenna extends in one dimension to one side of the chip, leaving room for the tamper loop. FIG. 2g shows a label onto which a transponder has been attached.

One advantageous geometric feature of the invention is that when the tamper loop can be arranged on one side of the chip, the loop can be made large enough to have a transparent opening in the middle so that text can be printed on a layer behind the loop area and the loop does not obscure it. Alternatively, when the loop is pulled to the side as in FIG. 2c, there may be space next to the loop for printing text visibly. A situation where text describing a product has been printed on the care label of a garment, and the tamper loop has been attached on top of the text. Due to the transparent opening in the middle of the loop, the text can be read. Alternatively, the tamper loop may comprise an opaque opening in the middle, or a transparent opening, on which text can be printed directly on the RFID inlay (instead of behind the loop). An item such as a care label has limited space for printing text, and the described tamper loop designs enable good use of space on the care label.

FIGS. 3a and 3b show a system and a method for manufacturing tags and products having tamper-protection functionality according to the invention.

Manufacturing a tag may take place at a tag manufacturing facility, or it may take place elsewhere such as a factory or place of assembly where other products are being created. There may be a party who purchases empty tags and programs them. In other words, the party does not manufacture the tags but it may program and/or modify the tags.

FIG. 3a shows a system for manufacturing tags with data stored in the tag memory. The chips 315 for the tags may be manufactured and/or programmed by one entity 310. The antennas and the protective layers 325 may be manufactured by one or more other entities 320. The different elements making up a tag may be then combined to form a tag 330. At the time of combining or at a different time, the properties of a tag may be determined at 340, for example to form the data to be stored into the tag memory. For example, the product identifier may be stored into the tag memory. This may happen at any phase, e.g. during or after chip manufacturing, during or after combining the tag, or during printing (conversion), or in a completely separate phase. The tag may then be printed 350 at a facility where the tag is taken into use. The data may be stored to the memory of the tag at this point, or the storing may happen at an earlier phase. The result of this process is a tag 360 with tamper-protection functionality. The tag may be formed into a care label 370 for a garment, as explained earlier. Consequently, the care label may be attached to garment 375.

The system in FIG. 3a may be implemented in a single facility by a single operator, or the different elements may be carried out at different locations.

FIG. 3b shows a method for manufacturing tags with tamper-protection functionality. Some of all of the method steps may be carried out by a single entity, or the steps may be carried out by different entities. At phase 380, the chip for the tag is manufactured so that it can contain product information and provide tamper-protection functionality. At phase 382, the chip is programmed, e.g. to contain program code and data. Password areas on the chip may also be programmed, e.g. to contain application data such as calibration information. Typically, however, the chip will be programmed or arranged to contain basic functionality for operating a transponder, and data and additional programming may be carried out e.g. in phase 390. At phase 384, the antenna and the substrate layer are manufactured. This may happen so that a plastic (e.g. PET) substrate with a metal layer (e.g. aluminum) on top is formed. Then, an antenna is formed by etching away the other areas of the metal layer than what will form the antenna. At phase 386, the antenna and the substrate layer are combined with the chip to form a tag (that is, the chip is connected electrically with the antenna), which may be covered by additional protective layers or glue layer(s). At this phase, password areas on the tag may also be programmed, e.g. to contain application data such as service access information. It is to be noted that for so-called passive tags, there will not be an energy source on the tag, that is, they will be energetically essentially passive. The tags will draw their energy essentially from the read-out signal, as explained earlier. At phase 388, the product information for the tag may be determined for storing onto the tag or to be kept in a database for later access based on the tag identification. For example, product identification information may be determined and password areas on the chip may be programmed, e.g. to contain this data. At phase 390, the tag may be printed, that is, the tag may receive information such as an electronic product code. At this phase, password areas on the tag may also be programmed, e.g. to contain application data. At phase 392, a care label may be formed, which is then sewn into a garment in step 394. In the above, it needs to be understood that method steps may happen in a different order, or some of the method steps may be missing. For example, the tag may be applied on a care label before coding the tag and printing the care label. In other words, a blanco care label may be formed first, and then the chip may be programmed and information may be printed on the care label.

Figure 4A:
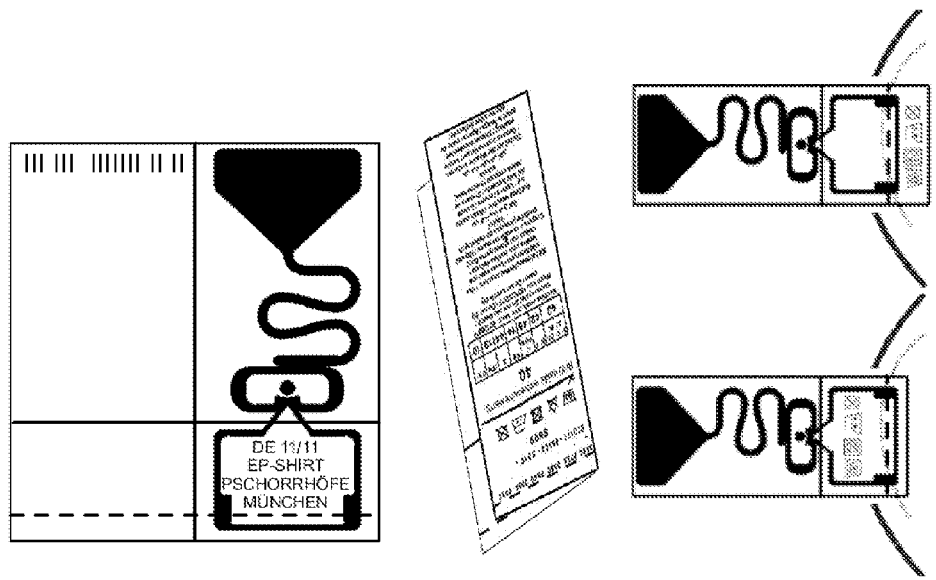
FIGS. 4a and 4b illustrate attachment and removal of a care label to a product according to the invention.
Figure 4B:
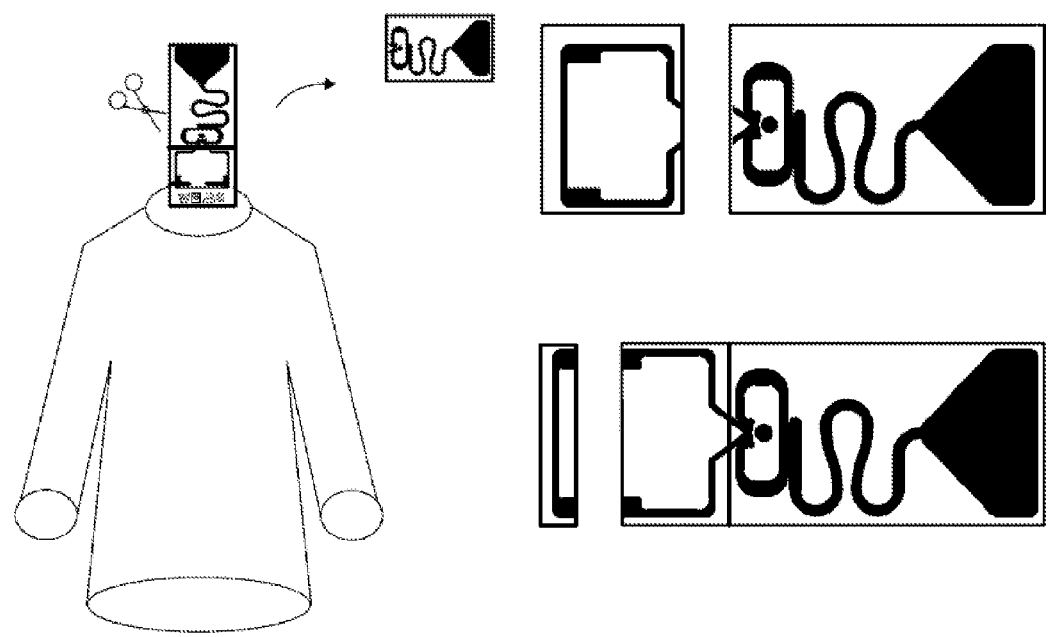

FIGS. 4a and 4b illustrate attachment and removal of a care label to a product according to the invention.

In a more general setting, a product label for a product comprising a radio-frequency transponder and a tamper-protection loop with a penetratingly attachable tamper-protection loop element can be attached to a product. The tamper-protection loop element is located on the product label at a place where the product label can be penetratingly attached to the product such that product information on the product label is left visible.

As shown in FIG. 4a, a care label for a garment may comprise a radio-frequency transponder as described earlier, with a tamper-protection element having a sewable part so that the care label can be sewn on the garment along the dashed line. In other words, the sewable part may be located on the care label at a place where said care label can be sewn to a garment so that care indicators on the care label are left visible as shown on the right. This is indicated with a dashed sew line and a zigzag pattern in FIG. 4a.

The tamper-protection element may be placed essentially along at least one edge of the care label (e.g. the top or bottom) e.g. so that space is left for text to be visible through an opening of the tamper loop and/or so that cutting or tearing the care label even partially will break the tamper loop. As shown in the middle of FIG. 4a, the care label may also be foldable to form two layers between which the transponder elements can be arranged.

In other words, the care label for a garment can be manufactured as follows. The care label is divided to a first part to be left in said garment and a second part to be removed, e.g. at the position of the cutting indicator. Product information such as instructions for care are printed on this first part of the care label. A radio-frequency transponder (or elements thereof) is placed on the care label. The transponder comprises a chip, an antenna and a tamper-protection element. The tamper-protection element is placed on the first part of said care label and the chip and the antenna are placed on said second part of said care label. That is, the transponder elements are arranged so that the chip and antenna are placed in the part of the care label intended to be cut away before wearing the garment. The radio-frequency transponder is attached to the care label e.g. by glue.

The care label may comprise an indication for cutting away said transponder when the garment has been bought. A person may want to remove the tag for privacy concerns, or simply for the reason that a large and hard care label is inconvenient when wearing the garment. The indication may be positioned so that when said care label is cut along the indication, the tamper-protection element is also cut and the electrical conductivity of said tamper-protection element is broken. The indication may comprise a perforation such that the care label can be also torn by hand along the indication, again breaking the tamper-protection element (tamper loop). The indication may be useful for a person wishing to remove part of the care label but wishing to leave important care information still in the label. Having an indicator thus serves two purposes: being a cutting aid and indicating the position where the active transponder can be completely removed, leaving only the tamper loop.

The care label may comprise a hard substrate or protective layer in the area of the antenna and the chip. The purpose of this hard protection is to prevent breaking the antenna or the chip by cutting or tearing. In other words, this protection may make it very difficult to completely destroy the transponder, still leaving the possibility of removing the active transponder in one piece. In this manner, if a wannabe thief tries to cut or tear the care label off, the label will be severed so that only the tamper loop is broken, and the transponder remains functional, indicating that the tag has been tampered.

As indicated in FIG. 4a, the care label can be sewn into a seam of a garment as follows. Thereby, a garment can be created. The care label may be placed at least partially on a layer of fabric. As explained, the care label comprises a radio-frequency transponder with a tamper-protection element having a sewable part. Another layer of fabric is then placed at least partially on the care label, resulting in the care label being at least partially placed between the two layers of fabric. The care label is then attached to the garment by sewing, gluing or stapling the layers of fabric together (with the care label in between) to form a seam. Alternatively, the care label may just be placed on top of a layer of fabric and sewn to the fabric to form a seam. In other words, the care label does not have to be placed between two layers of fabric.

An advantage of the latter approach is that the whole care label may be left visible. Yet alternatively or in addition, the care label can be passed through a loop or hole in the garment such as a button hole of a shirt, a belt loop of trousers and jeans or a hang loop of a coat, and bent over to form a care label loop which is closed by sewing or other means for forming of a seam. In other words, the care label may be formed into a loop and closed in place by forming a seam. In the last alternative, the care label and the seam may or may not be penetratingly attached to the garment, but instead be attached to the garment by forming a loop through a hole in the garment. The seam is located at least partially across a sewable part of the tamper-protection element (tamper loop) such that removing the care label from the garment without breaking the tamper-protection element is difficult. In other words, of the care label is removed by cutting or tearing, the tamper loop is broken. Even removing the label carefully may be difficult, and at least the label may not be usable again, as explained earlier. The care label is attached to the garment so that care indicators on the care label are left visible. Similar attachment methods as described above may be used for other products than garments, too.

In FIG. 4b, the use and functionality of a care label in a garment is depicted. A garment comprising a care label as described earlier is shown. The care label has been sewn into a seam of the garment so that a part of the tamper loop extends into the seam. The seam has been sewn into the tamper loop so that removing the care label from the garment without breaking the tamper loop is difficult.

In the care label, the PET plastic substrate may extend in the care label only under the antenna and chip of the transponder. Thereby cutting the antenna and chip away, the tough PET substrate can be removed, and a soft part of the care label is left. A person legally buying the garment may thus remove the hard part of the care label and still have a useful care label portion left.

The tamper-protection element may be mounted on the care label in a removable manner so that said tamper-protection element can be removed by hand e.g. after the hard part of the transponder has been removed. For example, the tamper loop may be attached with hot foiling/foil stamping, embossing or light glue so that it can be peeled off the care label. This may make the remaining care label even softer.

FIG. 4b shows two different ways of cutting the care label off. The first illustration on the right shows cutting the care label so that the tamper loop is left in the remaining part almost completely. Nevertheless, the tamper loop is broken, and the transponder in the second part will indicate tampering. In the second illustration on the right, the care label has been removed almost completely by cutting it very close to the seam of the garment. Nevertheless, because the tamper loop extends to within the garment, even this cut line will break the tamper loop, and the transponder will indicate tampering. In other words, a person legally buying the garment may remove the care label as he/she wishes. However, a person trying to steal the garment will not be able to avoid the tamper indication by simply cutting the care label at a certain position. If the label is cut so that the antenna is severed, the tag will stop responding completely. In either case, the system for monitoring the tags can indicate either tampering or destruction of the tag. In the earlier case, the location where the tampering takes place can be determined by locating the remaining active transponder.

The transponders and care labels as described may have advantages in the whole logistic chain after the sewing company has attached the care labels to garments. For example, the transfer of tags from genuine articles to counterfeit articles may be detected, since the care label may be arranged to be sewable only once. Also, the theft of articles during transport may be detected even if the transponders are cut off and left in the transport container. These cut off care labels will namely indicate tampering.

A method of unauthorized re-use of tamper-protected care labels will be described next. The care label comprises a radio-frequency transponder with a tamper-protection element having a sewable part as described earlier. First, the tamper-protected care label is removed from a garment by cutting the sewing threads of a seam where the care label has been sewn into along the sewable part. This requires care, but may be possible. To re-use the care label, the care label is placed at least partially on a layer of fabric, and then another layer of fabric is placed at least partially on the care label, so that the care label is at least partially placed between the layers of fabric. Finally, the care label is attached to said garment by sewing, gluing or stapling said layers of fabric and said care label together to form a seam, the seam being located at least partially across the sewable part of the tamper-protection element so that removing said care label from the garment without breaking the tamper-protection element is difficult. Alternatively, as explained earlier, the care label may just be placed on top of a layer of fabric and sewn to the fabric to form a seam. In other words, the care label does not have to be placed between two layers of fabric. By re-sewing, the tamper loop may be broken, and the care label transponder may therefore indicate tampering (i.e. indicate a counterfeit article).

The various embodiments of the invention can be implemented with the help of computer program code that resides in a memory and causes the relevant apparatuses to carry out the invention. For example, a tag, a chip or a reader device may comprise circuitry and electronics for handling, receiving and transmitting data, computer program code in a memory, and a processor that, when running the computer program code, causes the reader device to carry out the features of an embodiment. Alternatively or in addition, a tag or a chip for a tag or a reader device may comprise logic circuitry for implementing the same functionality as may be carried out by means of program code run on a processor. Yet further, a network device may comprise circuitry and electronics for handling, receiving and transmitting data, computer program code in a memory, and a processor that, when running the computer program code, causes the network device to carry out the features of an embodiment. A system may comprise any number of tags of the same kind or different kinds, and reader devices and network computers in any combination.

It is obvious that the present invention is not limited solely to the above-presented embodiments, but it can be modified within the scope of the appended claims.

The invention claimed is:

1. A tamper-protection loop element for use in a tamper-protection loop of a radio-frequency transponder configured to be affixed to an object, the tamper-protection loop element comprising an electrically conductive material forming an electrically conductive circuit that is configured to be sewn onto the object, wherein an electrical conductivity of the tamper-protection loop element is maintained despite any openings formed in the electrically conductive material resulting from the sewing.

2. The tamper-protection loop element according to claim 1, wherein the electrically conductive material of said tamper-protection loop element comprises a sewable part, the sewable part configured to be sewn onto the object using a sewing needle, said sewable part being electrically conductive for passing electric current through the tamper-protection loop element such that an intactness of the tamper-protection element can be detected, said sewable part having a width that is greater than a thickness of the sewing needle and the openings formed in the sewable part by the sewing needle, such that the openings formed in the sewable part by the sewing needle do not interrupt the electrical conductivity of the sewable part and the tamper-protection loop element.

3. The tamper-protection loop element according to claim 2, wherein the electrically conductive material of said tamper-protection loop element comprises an electrically conductive grid or a plurality of electrical conductors, the electrical conductive grid or plurality of electrical conductors having a minimum width that is greater than an opening in the electrically conductive grid or the plurality of electrical conductors formed by a needle puncture to maintain electrical conductivity of the loop element for indicating intactness of the tamper-protection loop.

4. A tamper-protection loop element according to claim 1, wherein the electrically conductive material is configured to conduct an electric current through the tamper-protection loop, wherein an interruption in the electric current identifies a break in the tamper-protection loop.

5. A tamper-protection loop element according to claim 4, wherein the tamper-protection loop comprises a flexible soft material suitable for wearing.

6. A conductor arrangement for a radio-frequency transponder configured to be attached to an object, said conductor arrangement comprising:
   a tamper-protection loop for the radio-frequency transponder and an electrical conductor that forms an antenna for said radio-frequency transponder, the tamper-protection loop comprising:
      an electrically conductive material that is configured to be sewn onto the object, wherein an electrical conductivity of the electrically conductive material is maintained despite any openings formed by the sewing of the electrically conductive material onto the object, and wherein a size of any openings formed by the sewing are less than a width of the electrically conductive material, and an uninterrupted electrical current flowing through the electrically conductive material indicates an intactness of the tamper-protection loop.

7. The conductor arrangement according to claim 6, comprising a radio-frequency identification chip, said antenna being placed essentially asymmetrically with respect to a position of said chip, said tamper-protection loop placed on an opposite side of the antenna with respect to said chip position.

8. The conductor arrangement according to claim 7, said tamper protection loop configured to be closed by an attachable conducting segment such as conducting sewing thread, glue or an attachable conductor element.

9. The conductor arrangement according to claim 7, comprising a radio-frequency transponder chip electrically coupled to said conductor arrangement.

10. The conductor arrangement according to claim 9, wherein said antenna is a monopole antenna.

11. The conductor arrangement according to claim 10, wherein said tamper-protection loop is placed on an opposite side of the antenna with respect to said radio-frequency transponder chip.

12. A product label for a product comprising:
   a radio-frequency transponder;
   a tamper-protection loop communicatively coupled to the radio frequency transponder, the tamper-protection loop comprising a tamper-protection loop element, the tamper-protection loop element comprising an electrically conductive material that is configured to be secured to the product by sewing with a needle, wherein an electrical conductivity of the tamper-protection loop element is maintained despite any openings formed in the tamper-protection loop element by the sewing;
   said tamper-protection loop element being located on the product label at a place where said product label and the tamper-protection loop element can be attached by sewing to said product such that product information on the product label is left visible.

13. A product label according to claim 12 wherein the product label is a care label for a garment, and the tamper-protection loop element comprises a sewable part, said sewable part being located on the care label at a place where said care label can be sewn to the garment such that care indicators on the care label are left visible.

14. The product label according to claim 13, comprising an indication on the product label for cutting away said transponder, said indication positioned so that when said care label is cut along said indication, said tamper-protection loop is cut and the electrical conductivity of said tamper-protection loop is broken.

15. The product label according to claim 14, wherein said indication comprises a perforation such that said care label can be torn along said indication, breaking the tamper-protection element.

16. The product label according to claim 13, comprising an antenna for the radio frequency transponder and a hard substrate or protective layer in an area of said antenna and said radio-frequency identification chip such that said hard substrate or protective layer prevents breaking said antenna or said radio-frequency identification chip by cutting or tearing.

17. A garment comprising a care label according to claim 13.

18. A garment according to claim 17, comprising a seam, a care label sewn into the seam of the garment, an electrically conductive part of the tamper-protection loop extending and sewn into a sewn portion of the seam.

19. A method of manufacturing a garment, comprising:
placing a care label at least partially on a layer of fabric, said care label comprising a radio-frequency transponder with a tamper-protection loop having a tamper-protection loop element, and
attaching said care label to said garment by sewing, gluing or stapling said layers of fabric and said care label including the tamper-protection loop together to form a seam, said seam being located at least partially across said tamper-protection loop element of said tamper-protection loop, the tamper-protection loop forming an electrically conductive circuit and wherein removing said care label from the garment separates the tamper-protection loop element from the tamper-protection loop and breaks the electrically conductive circuit of the tamper-protection loop.

20. The method according to claim 19, comprising:
placing the care label through a hole in said garment, said care label comprising a radio-frequency transponder with the tamper-protection loop, and
forming a closed loop of said care label such that part of said garment is left inside said care label loop.

* * * * *